Patented Feb. 10, 1948                                           2,435,724

UNITED STATES PATENT OFFICE 2,435,724

METHOD OF INCREASING AND PROLONGING THE FLOW OF OLEORESIN FROM TREES

Carl E. Ostrom and Clifford S. Schopmeyer, Lake City, Fla.; dedicated to the free use of the People in the territory of the United States No Drawing. Application October 8, 1947, Serial No. 778,724

5 Claims. (Cl. 47—10)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon, throughout the world.

We hereby dedicate the invention herein described to the free use of the People in the territory of the United States to take effect on the granting of a patent to us.

This invention relates to a method of increasing the flow of oleoresins and gums from cut surfaces of trees. It relates in particular to stimulating the flow of resins from wounds in the trunks of coniferous trees, such as pine trees.

An object of this invention is to increase the yield of oleoresin obtained from wounds in trees by applying to the wounds a chemical of the class known as plant-growth regulators. These regulators are defined as chemicals which, when applied in very dilute concentrations to external surfaces of living plants or plant parts, cause an abnormally large rate of growth in certain cells of the plant, and, when applied in larger concentrations, become toxic to the plant. They are chiefly substituted aromatic compounds.

The invention is not to be construed as limited to the particular plant-growth regulators described below. It is within the purview of our invention to employ other known plant-growth regulators, especially those of high activity as plant-growth regulators.

The regulators may be applied to wounds in pine trees made by chipping away or boring through the trunk.

The following examples illustrate the invention.

Example 1

The bark of slash pine was punched through to the xylem, the holes being 0.75 inch in diameter. The holes were sprayed with a solution or suspension of the plant-growth regulator. Yields were collected over a period of eight weeks and the volume measured. The trees were wounded and treated with the plant-growth regulator three times during the 8-week period; that is, at the start, after 2 weeks, and after 6 weeks. The following table presents the results obtained with various concentrations of aqueous solutions of the sodium salt of 2,4-D (i. e., 2,4-dichlorophenoxyacetic acid), aqueous solutions of the morpholine salt of 2,4-D, and oil suspensions and oil-water emulsions of the methyl and amyl esters of 2,4-D. The yields are compared with a control employing no plant-growth regulator, nor any other treatment.

Table A

| 2,4-D Formulation | Concentration (2,4-D free acid equivalent), Per cent | Medium | Mean Yield per wound after 8 weeks | |
|---|---|---|---|---|
| | | | cc. | Per cent of Check |
| Sodium salt | 4 | Water | 86 | 478 |
| Do | 2 | do | 69 | 383 |
| Do | 1 | do | 48 | 267 |
| Morpholine salt | 16 | do | 130 | 722 |
| Do | 8 | do | 126 | 700 |
| Do | 4 | do | 86 | 478 |
| Methyl ester | 16 | Oil | 54 | 300 |
| Do | 8 | Oil-water emulsion | 69 | 383 |
| Do | 4 | do | 39 | 217 |
| Amyl ester | 16 | Oil | 68 | 378 |
| Do | 8 | Oil-water emulsion | 50 | 278 |
| Do | 4 | do | 45 | 250 |
| Check (No treatment) | 0 | | 18 | 100 |

Example 2

A like procedure was applied to longleaf pine, the wounding and treating being done twice, that is, at the start and after 2 weeks. The yield was collected over a period of four weeks. The following table presents the results obtained with aqueous solutions of the morpholine salt of 2,4-dichlorophenoxyacetic acid, and with powdered crystals of the sodium salt of this acid, and with powdered crystals of this free acid.

Table B

| 2,4-D Formulation | Concentration (2,4-D free acid equivalent), Per cent | Medium | Mean Yield per wound after 4 weeks | |
|---|---|---|---|---|
| | | | cc. | Per cent of Check |
| Morpholine salt | 16 | Water | 30 | 230 |
| Do | 8 | do | 34 | 262 |
| Do | 4 | do | 32 | 246 |
| Sodium salt | 87 | Powdered crystals | 37 | 284 |
| Free Acid | 100 | do | 36 | 276 |
| Check | 0 | | 13 | 100 |

Example 3

Wounds or "streaks" of the size and shape used in some commercial naval stores operations were cut on both slash pine and longleaf pine using a bark-chipping tool or "hack." This tool removes only the bark and phloem but none of the wood. The freshly cut streaks were sprayed with an aqueous solution of the morpholine salt of 2,4-dichlorophenoxyacetic acid having a concentration equivalent to 8 percent of this free acid. One week after such treatment yields of oleoresin were more than double those obtained from conventional streaks cut into the wood for a depth of 0.5 inch and receiving no further treatment.

Among other growth regulators applicable is the potassium salt of alpha naphthaleneacetic acid employed, for example, in 5 percent aqueous solution. Alpha naphthaleneacetic acid may be applied in the same forms, in suspension, in solution, and as a powder, and as the corresponding salts, and esters, and as the free acid, as taught for 2, 4–D.

Having thus described our invention, we claim:

1. The method of obtaining increased flow of oleoresins and gums from coniferous trees comprising applying, to wounds in the bark, a plant-growth regulator taken from the group consisting of substituted aromatics.

2. The method described in claim 1 in which the regulator is taken from the group consisting of salts and esters of 2,4-dichlorophenoxyacetic acid and the free acid.

3. The method described in claim 1 in which the regulator is the morpholine salt of 2,4-dichlorophenoxyacetic acid.

4. The method described in claim 1 in which the regulator is free 2,4-dichlorophenoxyacetic acid in the form of a powder.

5. The method described in claim 1 in which the regulator is an ester of 2,4-dichlorophenoxyacetic acid.

CARL E. OSTROM.
CLIFFORD S. SCHOPMEYER.

REFERENCES CITED

The following references are of record in the file of this patent:

UNITED STATES PATENTS

| Number | Name | Date |
|---|---|---|
| 2,053,031 | Hessenland | Sept. 1, 1936 |